(12) United States Patent
Steven, III et al.

(10) Patent No.: US 7,093,742 B2
(45) Date of Patent: Aug. 22, 2006

(54) BELT CLIP ATTACHMENT DEVICE AND METHOD OF USE

(75) Inventors: John C. Steven, III, Broomfield, CO (US); Gad Shaanan, La Jolla, CA (US); Walter Francovich, Pierrefonds (CA); Francois Duval, Terrebonne (CA); Patrick Mainville, Montreal (CA); Benoit Orban, St.-Lambert (CA)

(73) Assignee: Kyocera Wireless Corp., San Diego, CA (US)

( * ) Notice: Subject to any disclaimer, the term of this patent is extended or adjusted under 35 U.S.C. 154(b) by 241 days.

(21) Appl. No.: 10/645,448

(22) Filed: Aug. 21, 2003

(65) Prior Publication Data

US 2005/0040192 A1 Feb. 24, 2005

(51) Int. Cl.
*A45F 5/00* (2006.01)

(52) U.S. Cl. ............... 224/197; 224/930; 224/669; 224/271

(58) Field of Classification Search .......... 224/197, 224/676, 930; 455/100, 575.6; 379/446, 379/447; 24/102 SL, 588, 591
See application file for complete search history.

(56) References Cited

U.S. PATENT DOCUMENTS

| | | | | |
|---|---|---|---|---|
| 4,158,983 A * | 6/1979 | Amico | ............... | 411/55 |
| 4,305,180 A * | 12/1981 | Schwartz | ............... | 439/296 |
| 4,492,047 A * | 1/1985 | Arff | ............... | 36/134 |
| 4,685,450 A * | 8/1987 | Collins et al. | ............... | 600/112 |
| 4,698,923 A * | 10/1987 | Arff | ............... | 36/128 |
| 4,762,503 A * | 8/1988 | Bohle et al. | ............... | 439/336 |
| 4,771,297 A * | 9/1988 | Lecheheb et al. | ............... | 347/29 |
| 5,496,289 A * | 3/1996 | Wenstrom, Jr. | ............... | 604/264 |
| 5,570,150 A * | 10/1996 | Yoneyama et al. | ............... | 396/324 |
| 5,597,102 A * | 1/1997 | Saarikko et al. | ............... | 224/197 |
| 5,641,012 A * | 6/1997 | Silversides | ............... | 141/383 |
| 5,664,292 A * | 9/1997 | Chen | ............... | 24/3.11 |
| 5,680,494 A * | 10/1997 | Kaas | ............... | 385/56 |
| 5,787,168 A * | 7/1998 | Lien | ............... | 379/455 |
| 5,787,341 A * | 7/1998 | Parkas et al. | ............... | 455/575.6 |
| 5,833,416 A * | 11/1998 | Cau | ............... | 411/55 |
| 5,850,954 A * | 12/1998 | Dong-Joo | ............... | 224/197 |
| 5,850,996 A * | 12/1998 | Liang | ............... | 248/221.11 |
| 5,865,795 A * | 2/1999 | Schiff et al. | ............... | 604/70 |
| 5,906,031 A * | 5/1999 | Jensen | ............... | 24/3.12 |
| 6,058,185 A * | 5/2000 | Alanara | ............... | 379/446 |
| 6,059,156 A * | 5/2000 | Lehtinen | ............... | 224/197 |
| 6,217,248 B1 * | 4/2001 | Reiff | ............... | 403/24 |
| 6,226,068 B1 * | 5/2001 | Arcykiewicz et al. | ............... | 439/314 |
| 6,283,348 B1 * | 9/2001 | Wang | ............... | 224/271 |
| 6,305,588 B1 * | 10/2001 | Michel et al. | ............... | 224/271 |
| 6,722,539 B1 * | 4/2004 | Iitsuka | ............... | 224/197 |
| 6,888,940 B1 * | 5/2005 | Deppen | ............... | 379/446 |
| 6,913,174 B1 * | 7/2005 | Harvey et al. | ............... | 224/197 |
| 2001/0047598 A1 * | 12/2001 | Kelly | ............... | 36/134 |
| 2002/0039853 A1 * | 4/2002 | Weingartner | ............... | 439/314 |

(Continued)

*Primary Examiner*—Nathan J. Newhouse
*Assistant Examiner*—Justin M. Larson

(57) ABSTRACT

A method of connecting a belt clip attachment device to a personal electronic device such as a mobile phone includes providing a belt clip attachment device for connecting the mobile phone to a belt clip, the belt clip attachment device and the rear of the mobile phone constructed so that the belt clip attachment device connects to the rear side of the mobile phone through a push and twist action on the belt clip attachment device; and connecting the belt clip attachment device to the rear side of the mobile phone by pushing and twisting the belt clip attachment device relative to the rear side of the mobile phone.

20 Claims, 3 Drawing Sheets

U.S. PATENT DOCUMENTS

2002/0139822 A1* 10/2002 Infanti ........................ 224/197
2003/0040213 A1* 2/2003 Norwood et al. ........... 439/489
2003/0085244 A1* 5/2003 Parsons ...................... 224/197
2003/0098323 A1* 5/2003 Taylor et al. ................ 224/197
2003/0141329 A1* 7/2003 Huang ........................ 224/197
2004/0204169 A1* 10/2004 Goradesky ............... 455/569.1

* cited by examiner

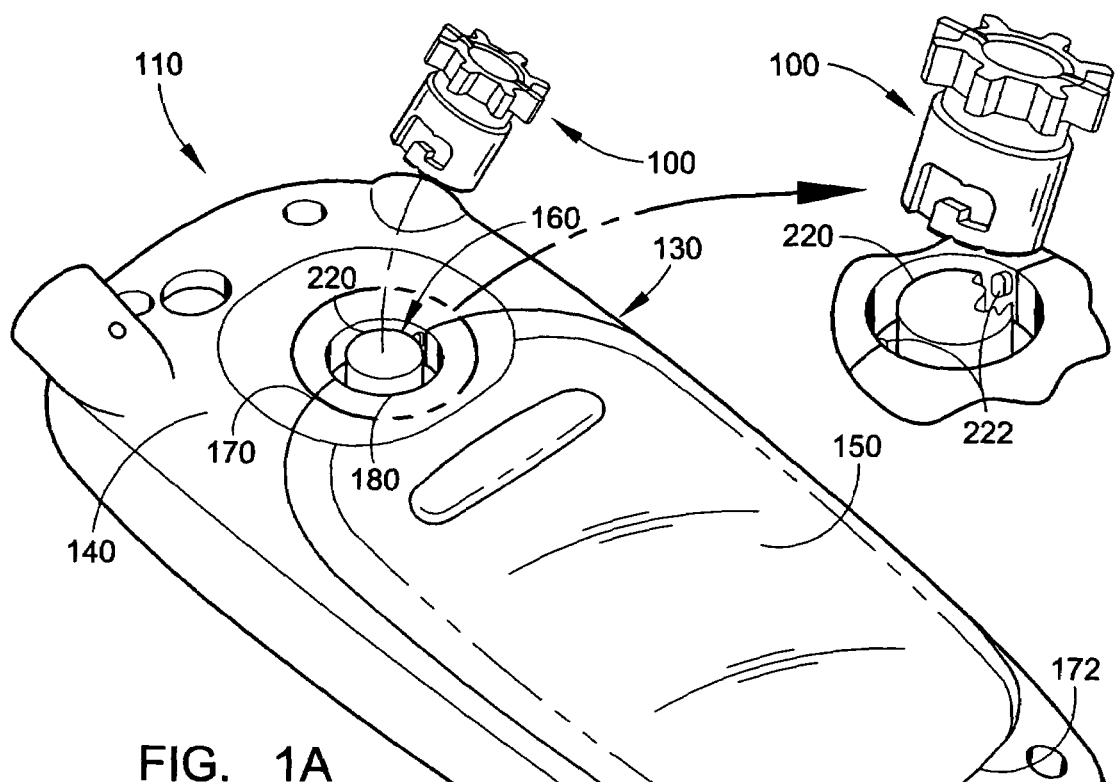
FIG. 1A
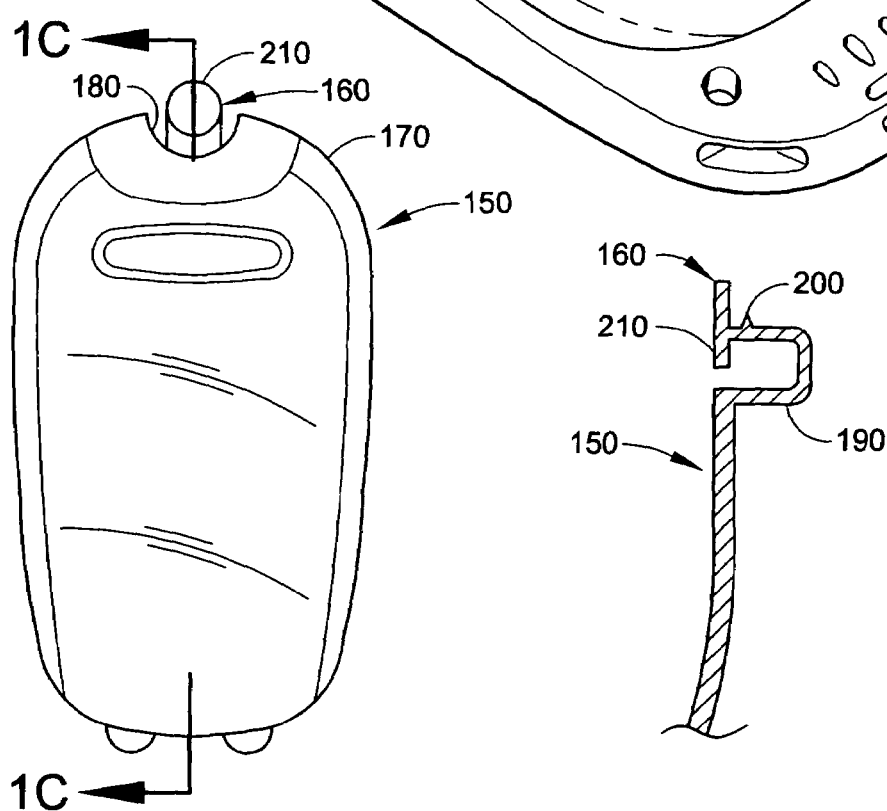
FIG. 1B
FIG. 1C

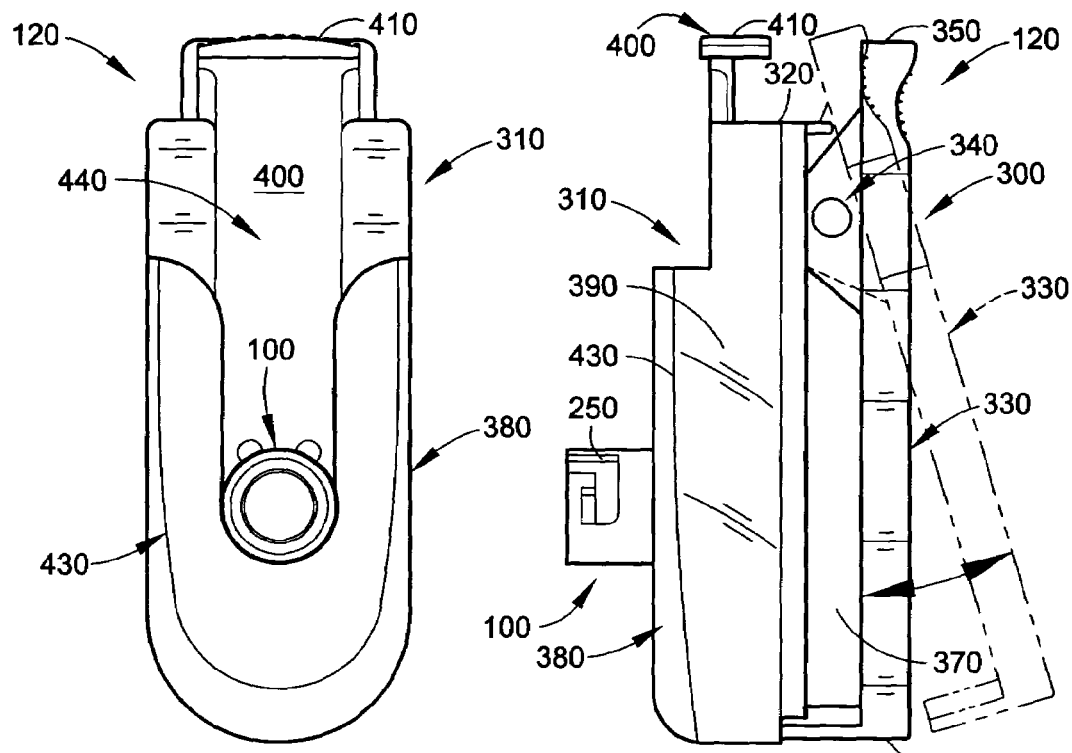
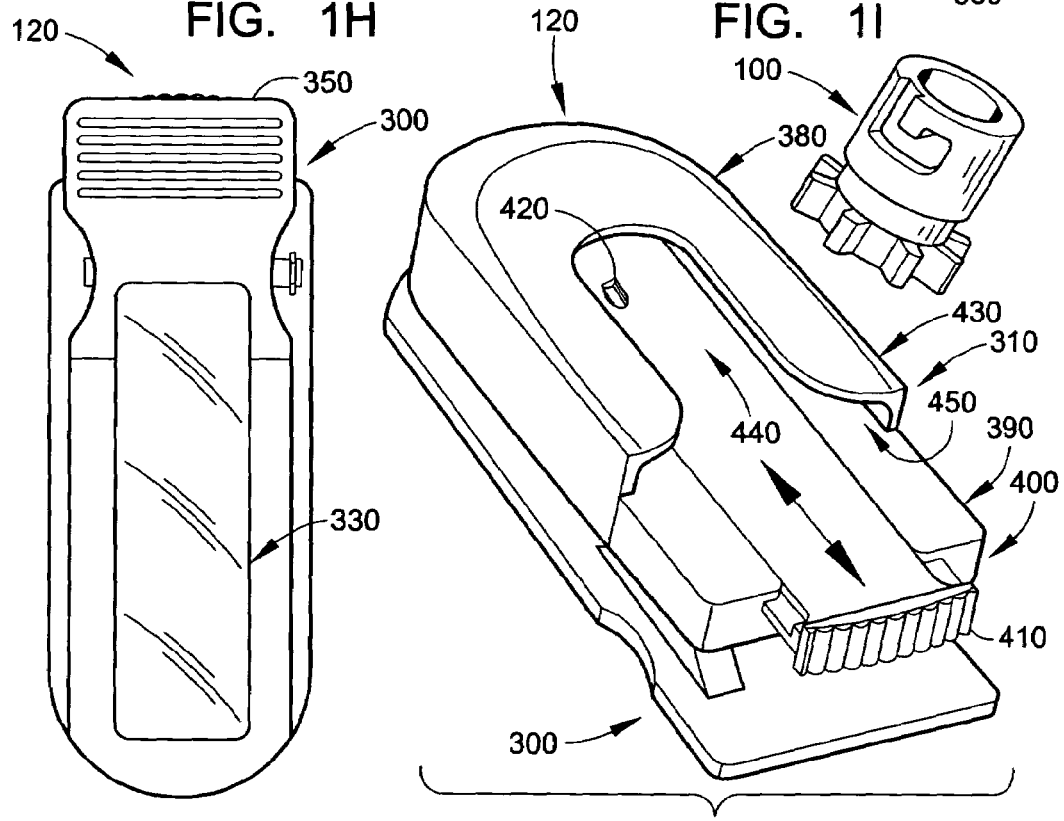
FIG. 1H  FIG. 1I  FIG. 1J  FIG. 1K ated in FIG. 1A.

BELT CLIP ATTACHMENT DEVICE AND METHOD OF USE

FIELD OF THE INVENTION

The present invention is in the field of belt clip attachment devices for attaching personal electronic devices such as wireless mobile phones to belt clips.

BACKGROUND OF THE INVENTION

Belt clips and belt clip attachment devices have been proposed in the past for connecting a mobile phone to the belt of a user. These belt clips and attachment devices have suffered from a number drawbacks, some of which include: the belt clips are too large and bulk, making them uncomfortable and obtrusive; use of the mobile phone with the belt clip often requires extra material on the sides of the mobile phone to attach the mobile phone to the belt clip (this is fine when the mobile phone is attached to the belt clip, but when the mobile phone is being used, the extra material makes the mobile phone bulky); often the belt clip is specific for a particular type of mobile phone, making the belt clip inoperable with other mobile phones; some belt clip attachment devices are difficult to install and/or difficult to remove from the mobile phone; the design of some belt clips and belt clip attachment devices inadvertently allows the mobile phone to pop off of the belt clip.

SUMMARY OF THE INVENTION

The above drawbacks and others are addressed by the belt clip and belt clip attachment device of the present invention.

An aspect of the invention involves a belt clip attachment device that attaches to an existing battery door latch on the rear side of a mobile phone. The belt clip attachment device includes a unique design that allows it to attach and lock to the battery door latch with a unique pushing and rotating motion. The belt clip attachment device and a corresponding belt clip may have cooperative configurations that allow the belt clip attachment device and mobile phone to be connected to the belt clip at numerous possible orientations with respect to the user's belt. The belt clip attachment device may also be connected to a wide variety of generic belt clips currently on the market. The belt clip attachment device is universal in that it may be used with a variety of different mobile phones that are configured for attachment thereto.

Further objects and advantages will be apparent to those skilled in the art after a review of the drawings and the detailed description of the preferred embodiments set forth below.

BRIEF DESCRIPTION OF THE DRAWINGS

FIG. 1A is a perspective view of a mobile phone and a belt clip attachment device constructed in accordance with an embodiment of the invention.

FIG. 1B is a front elevational view of a battery compartment door and a door latch.

FIG. 1C is a side elevational view of the battery compartment door and the door latch of FIG. 1B.

FIGS. 1H–1K illustrate a front elevational view, a side elevational view, a rear elevational view, and a perspective view of an embodiment of a belt clip that may be used with the belt clip attachment device shown in FIG. 1A.

DETAILED DESCRIPTION OF PREFERRED EMBODIMENTS

Figure 1D:
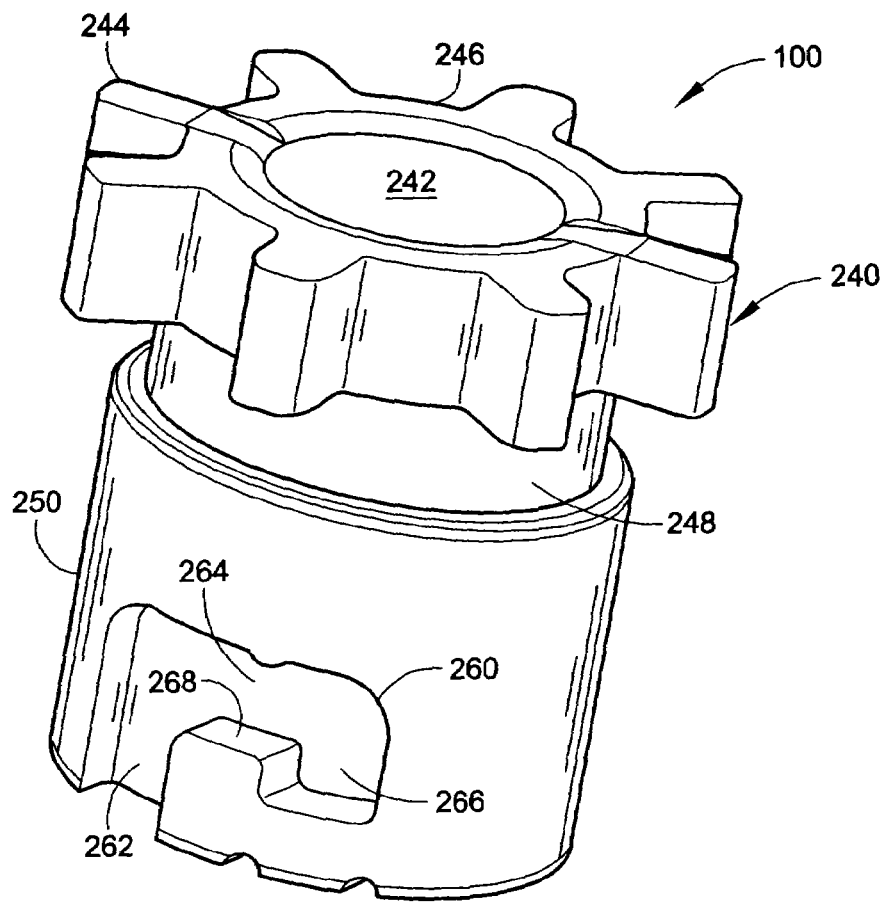
FIG. 1D is a perspective view of the belt clip attachment device illustrated in FIG. 1A.

With reference to FIGS. 1A–1K, an embodiment of a universal belt clip attachment device or knob 100 used to connect a mobile phone 110 to a belt clip 120 will now be described. Although the universal belt clip attachment device 100 will be described as being used to connect a mobile phone 110 to a belt clip 120, the universal belt clip attachment device 100 may be used to connect other personal electronic devices to the belt clip 120. Before describing the belt clip attachment device 100, the mobile phone 110 will first be described.

The mobile phone 110 includes a housing 130 with a rear side 140 and a substantially elliptical battery compartment door 150 detachably locked to the rear side 140 through a battery compartment door latch 160. The battery compartment door 150 includes a top curved edge 170 and a bottom curved edge 172. Adjacent the bottom curved edge 172, the battery compartment door 150 may include a tang (not shown) for use in attaching the battery compartment door 150 to the housing 130. The top curved edge 170 may include a semi-circular cut out 180 near the center of the top curved edge 170.

As shown best in FIGS. 1C, 1D, a substantially C-shaped latch arm 190 extends from the top curved edge 170 at the semi-circular cut out 180. A tang 200 extends laterally from the latch arm 190 and is used to retain the battery compartment door latch 160 to the housing 130. The latch arm 190 terminates in a circular, disc-shaped latch actuator 210. When the battery compartment door 150 is in position in the rear side 140 of the housing 130, a circular recess 220 is formed around the latch actuator 210. In an alternative embodiment, the latch 160 may be connected to the housing 130 instead of the battery compartment door 150. Two pegs 222 extend laterally from the housing 130 and are received by the belt clip attachment device 100 in a manner to be described. Alternatively, the two pegs 222 may extend from the battery compartment door 150 such as from the latch arm 190. Further, in alternative embodiments the number of pegs 222 may be other than 2 (e.g., 1, 3, etc.). The battery compartment door 150 may be a thin member as shown, or may be part of a thicker member such as part of a rechargeable battery, fuel cell, or other renewable power source.

With reference to FIG. 1D, the belt clip attachment device, adapter, or knob 100 will now be described in more detail. The belt clip attachment device 100 includes a belt clip engagement member 240 having a starburst configuration. In alternative embodiments, the belt clip engagement member 240 may have configurations other than a starburst configuration. For example, but not by way of limitation, the belt clip engagement member 240 may have a circular configuration, an elliptical configuration, an oval configuration, a curvilinear configuration, or a rectilinear configuration. The belt clip engagement member 240 includes a central circular well 242 and a plurality of outwardly curved radiating projections 244 joined by respective inwardly curved connection portions 246. An upper cylindrical member 248 joins the belt clip engagement member 240 to a lower cylindrical hub 250.

Opposite C-shaped slots 260 are located in the lower cylindrical hub 250. Although two slots 260 are described, other numbers of slots 260 may be used (e.g., 1, 3, 4, etc.). Each slot 260 may include an insertion/removal tack 262, a rotation track 264, and a locking track 266. A stop or post 268 may separate the insertion/removal track 262 from the locking track 266. A resilient member 270 (See FIGS. 1E–1G) may be located within the upper cylindrical member 248 and the lower cylindrical hub 250. Exemplary resilient members that may be used for the resilient member 270 include, but not by way of limitation, an elastic rubber disc and a spring.

Figures 1E, 1F, 1G:
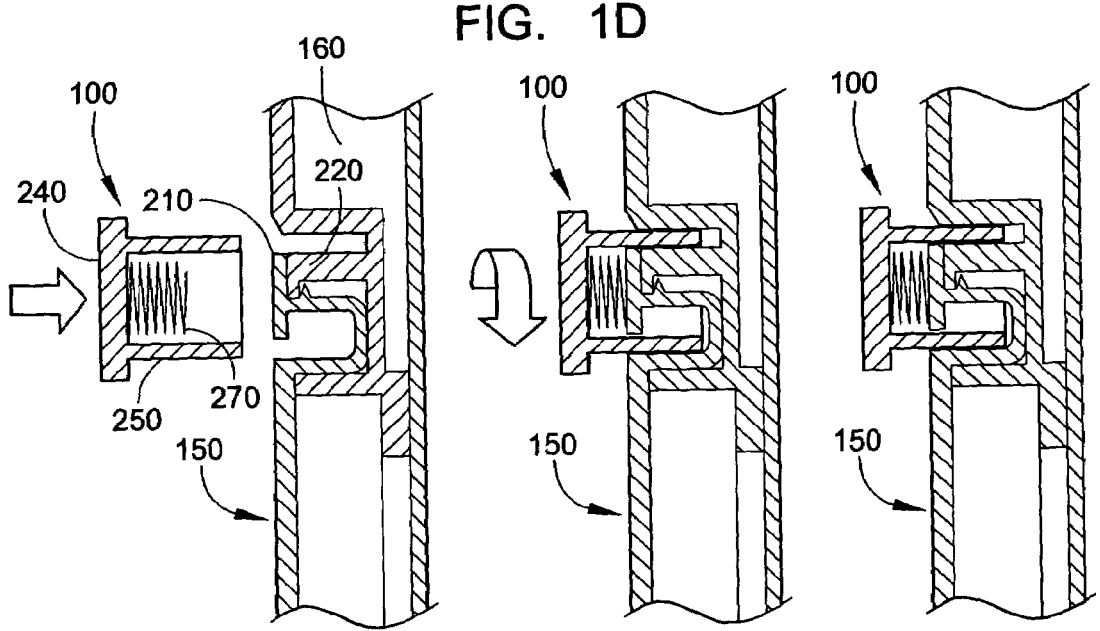
FIGS. 1E–1G illustrate a cross-sectional view of the belt clip attachment device and a rear portion of the mobile phone illustrated in FIG. 1A, and show an exemplary method of attaching the belt clip attachment device to the door latch of the battery compartment door.

With reference to FIGS. 1E–1G, attachment of the belt clip attachment device 100 to the mobile phone 110 will now be described. As shown in FIG. 1E, the belt clip attachment device 100 is attached to the mobile phone 110 by aligning the insertion/removal track 262 of the belt clip attachment device 100 with the lateral pegs 222 (FIG. 1A), and pressing and inserting the open circular end of the lower cylindrical hub 250 over the circular latch actuator 210 so that the lateral pegs 222 are slidably received into the insertion/removal track 262. The resilient member 270 urges the belt clip attachment device 100 in the opposite direction, so an opposite pushing pressure is required to overcome the pressure exerted by the resilient member 270. As shown in FIG. 1F, the belt clip attachment device 100 is then rotated or twisted while maintaining this pushing force so that the lateral pegs 222 are slidably received in the rotation track 264 past the stop 268. As shown in FIG. 1G, the belt clip attachment device 100 is then released so that the resilient member 270 urges the belt clip attachment device 100 outward and the lateral pegs 222 are slidably received in the locking track 266 until the lateral pegs 222 abut the stop 268. In the position shown in FIG. 1G, the belt clip attachment device 100 is locked in place.

To unlock the belt clip attachment device 100 from the mobile phone 110, the belt clip attachment device 100 is pressed towards the mobile phone 110, rotated in a direction opposite to that shown in FIG. 1F, and then released and removed from the circular latch actuator 210.

Although the belt clip attachment device 100 is described as being attached to the battery compartment door latch 160, in alternative embodiments, the mobile phone 110 may have an alternative configuration where the belt clip attachment device 100 attaches to the rear side 140 of the mobile phone 110 at an alternative location.

With reference to FIGS. 1H–1K, an embodiment of a belt clip 120 that the universal belt clip attachment device 100 may be used with will now be described. The belt clip 120 includes a belt attachment section 300 and an opposite-facing phone attachment section 310.

The belt attachment section 300 includes a back plate 320 and a clip 330 pivotally attached to the back plate 320 by a pivot mechanism 340. The pivot mechanism 340 preferably includes a spring (not shown) to urge the clip 330 in the position shown in FIGS. 1H–1K. An upper part of the clip 330 includes a pivot control member 350 and a lower part of the clip 330 includes a closed end 360. A belt-receiving recess 370 is formed between the clip 330, the back plate 320, the pivot mechanism 340 and the closed end 360.

The phone attachment section 310 includes an elongated narrow frame 380. A rear portion 390 of the frame 380 slidably receives an actuation member or plunger 400. The actuation member 400 includes side flanges that are slidably received by a track of the rear portion 390 of the frame 380. An upper part of the actuation member 400 includes a broad thumb-engagement portion 410. A lower part of the actuation member 400 include a hole that slidably receives a movable locking tang 420. The movable locking tang 420 and the actuation member 400 preferably include respective springs (not shown) to urge the tang 420 and the actuation member 400 in the positions shown in FIG. 1K. Adjacent a bottom of the actuation member 400, the actuation member 400 includes one or more stops (not shown) that cooperate with the projections 244 and connection portions 246 of the belt clip engagement surface 240 to maintain the belt clip attachment device 100 (and the mobile phone 110) in a desired orientation.

A front portion 430 of the frame 380 has a substantially C-shaped configuration with an elongated central recess 440 for slidably receiving the cylindrical hub 250 of the belt clip attachment device 100 and opposite tracks 450 for slidably receiving the belt clip engagement member 240 of the belt clip attachment device 100.

When the belt clip attachment device 100 (with attached mobile phone 110) is slid to the position shown in FIGS. 1H, 1I, the belt clip engagement member 240 contacts and urges the movable locking tang 420 rearward. Once the belt clip engagement member 240 clears the movable locking tang 420, the movable locking tang 420 is urged by its spring to the position shown in FIG. 1K so that the movable locking tang 420 is disposed within the well 242 of the belt clip attachment device 100. The tang 420 within the well 242, in addition to the one or more stops of the actuation member 400 engaged with the projections 244 and connection portions 246 of the belt clip engagement surface 240, lock the belt clip attachment device 100 (and mobile phone 110) in the position shown in FIGS. 1H, 1I, or other desired orientation relative to the user's belt that the user selects.

In the embodiment of the belt clip attachment device 100 shown, the belt clip attachment device 100 includes eight projections 244, connection portions 246, allowing the belt clip attachment device 100 (and mobile phone 110) to be oriented in eight different positions relative to the users belt in 45 degree increments (i.e., 0, 45, 90, 135, 180, 225, 270, or 315 degrees relative to the user's belt). In alternative embodiments, the number of projections 244, connection portions 246 may be a number other than eight (e.g., 0, 1, 2, 3, etc.).

To remove the belt clip attachment device 100 (and mobile phone 110) from the belt clip 120, the broad thumb-engagement portion 410 is pressed with the user's thumb, causing the actuation member 400 to disengage the movable locking tang 420. The belt clip attachment device 100 may then be slid freely upward and out of the elongated central recess 440 and tracks 450 of the belt clip 120.

In a similar fashion, a user may change the orientation of the belt clip attachment device 100 (and mobile phone 110) relative to a user's belt. After disengaging the movable locking tang 420, the belt clip attachment device 100 (and mobile phone 110) may be slid upward and rotated to the desired orientation relative to the user's belt, and slid downward to the position shown in FIG. 1H where the belt clip attachment device 100 (and mobile phone 110) are locked in the desired orientation.

The push, twist, and lock feature of the universal belt clip attachment device 100 provides an easy, convenient way to attach and secure the universal belt clip attachment device 100 to the mobile phone 100. The universal belt clip attachment device 100 may be used with a variety of different mobile phones 110 as long as the mobile phones 110 are configured for attachment thereto with the universal belt clip attachment device 100. As a result, the belt clip 120 may be used with a variety of different mobile phones 110.

Further, the universal belt clip attachment device 100 and belt clip 120 allow the user to easily orient one's mobile phone 110 in a variety of different orientations relative to the user's belt in addition to the standard orientation provided by existing belt clips and adapters (i.e., perpendicular and upright relative the user's belt or parallel to a user's belt). The belt clip attachment device 100 may also be connected to a wide variety of generic belt clips currently on the market.

It will be readily apparent to those skilled in the art that still further changes and modifications in the actual concepts described herein can readily be made without departing from the spirit and scope of the invention as defined by the following claims.

What is claimed is:

1. A belt clip attachment system for connecting a personal electronic device to a belt clip, the belt clip attachment system comprising:
   the personal electronic device comprising a housing having a rear face; a battery door on the rear face, wherein said housing has a recess; and a plurality of pegs projecting outward from an interior wall of the recess, wherein a first section of the recess is in the battery door and a second section of the recess is in the rear face such that a first end of a belt clip knob engages at least one peg of the plurality of pegs in the second section of the recess; and
   the belt clip knob, comprising:
      the first end for seating within the recess, the first end having at least one track for engaging the plurality of pegs through a push and twist action;
      a second end having an engagement member to connect the belt clip knob to the belt clip.

2. The belt clip attachment system of claim 1, wherein the engagement member includes an upper cylindrical member with a first diameter and a lower cylindrical hub with a second diameter less than the first diameter, wherein the lower cylindrical hub slides into a slot on the belt clip, the slot having width less than the first diameter of the upper cylindrical member such that the upper cylindrical member stays engages within the slot on the belt clip.

3. The belt clip attachment system of claim 1, wherein the engagement member comprises a well to receive a tang of the belt clip to maintain the belt clip knob in position with respect to the belt clip.

4. The belt clip attachment system of claim 1, wherein the personal electronic device further comprises:
   a battery door latch for connecting the battery door to the housing.

5. The belt clip attachment system of claim 1, further including a resilient member disposed within an interior chamber the belt clip knob that urges the belt clip knob into a locked position when the track of the first end of the belt clip knob is engaged with the plurality of pegs.

6. The belt clip attachment system of claim 1, wherein the engagement member is circular such that the belt clip attachment system connects to the belt clip at a plurality of orientation angles.

7. The belt clip attachment system of claim 6, wherein the engagement member includes a starburst configuration with multiple radiating projections, wherein a radiating projection of the multiple radiating projections engages with a locking tang of the belt clip to lock the belt clip attachment system in place.

8. A device attachment system comprising:
   an electronic device comprising a housing having a rear face and a detachable battery door disposed on said rear face, the detachable battery door comprising:
      a cylindrical recess having a recess diameter and an inside cylindrical wall, wherein a first section of the cylindrical recess is in the detachable battery door and a second section of the cylindrical recess is in the rear face of housing; and
      at least one lateral peg projecting outward from the inside cylindrical wall;
   a detachable knob having a knob diameter less that the recess diameter such that the detachable knob seats within the cylindrical recess, the detachable knob comprising:
      a locking track adjacent to a first end of the detachable knob, the locking track for engaging the at least one lateral peg when the detachable knob is partially rotated within the cylindrical recess; and
      a knob connection portion at a second end of the detachable knob; and
   a belt clip having a clip recess for accepting the knob connection portion of the detachable knob.

9. The device attachment system of claim 8, wherein the detachable battery door is on a rear surface of housing.

10. The device attachment system of claim 8, wherein the detachable battery door comprises a battery integral to the detachable battery door.

11. The device attachment system of claim 8, wherein the detachable knob engages the at least one lateral peg in the second section of the recess.

12. The device attachment system of claim 8, wherein the first section of the cylindrical recess in the detachable battery door comprises a battery door latch for latching the detachable battery door to the rear face of the housing.

13. The device attachment system of claim 8, wherein the knob connection portion at the second end of the detachable knob is circular such that the detachable knob and the attached electronic device connect to the belt clip at a plurality of orientation angles.

14. The device attachment system of claim 13, wherein the knob connection portion comprises a plurality of radiating projections in a starburst configuration, wherein a radiating projection of the plurality of radiating projections engages with a locking tang of the belt clip to lock the knob connection to the belt clip.

15. The device attachment system of claim 8, wherein the detachable battery door further comprises:
   C-shaped latch having a latch activator in a circular shape, the latch activator having a tang for engaging with a lip of the housing.

16. The device attachment system of claim 15, wherein the C-shaped latch is positioned inside of the cylindrical recess, and wherein the first end of the detachable knob is a cylinder having a hollow interior, the cylinder of the detachable knob having a sufficient inside diameter to accept the C-shaped latch into the hollow interior when the detachable knob is seated in the cylindrical recess.

17. A mobile phone for attachment to a belt clip, the mobile phone comprising,
   a housing having a back face, the back face comprising a battery recess;
   a removable battery seated in the battery recess, the removable battery forming a portion of the back face of the housing;
   a cylindrical recess formed into a first portion of the removable battery and a second portion of the back face adjacent to the removable battery, the cylindrical recess comprising an interior cylindrical wall with at least one peg projecting out from the interior cylindrical wall; and a removable universal clip seated in the cylindrical recess, the removable universal clip having a first end comprising a locking track for engaging the at least one peg to lock the removable universal clip in to the cylindrical recess, the removable universal clip having a second end for attachment to the belt clip.

18. The mobile phone of claim 17, wherein the second end of the removable universal clip is circular such that the mobile phone connects to the belt clip at a plurality of orientation angles.

19. The mobile phone of claim 17, wherein the second end of the removable universal clip comprises a plurality of radiating projections in a starburst configuration such that the mobile phone connects to the belt clip at a plurality of orientation angles, and wherein a radiating projection of the plurality of radiating projections engages with a locking tang of the belt clip to lock the mobile phone to the belt clip.

20. The mobile phone of claim 17, wherein the first portion of the removable battery that forms the cylindrical recess comprises a latch that secures the removable battery to the back face of the housing.

* * * * *